No. 745,297. PATENTED NOV. 24, 1903.
T. SAULT.
APPARATUS FOR PURIFYING BOILER FEED WATER.
APPLICATION FILED FEB. 25, 1901.
NO MODEL. 3 SHEETS—SHEET 1.
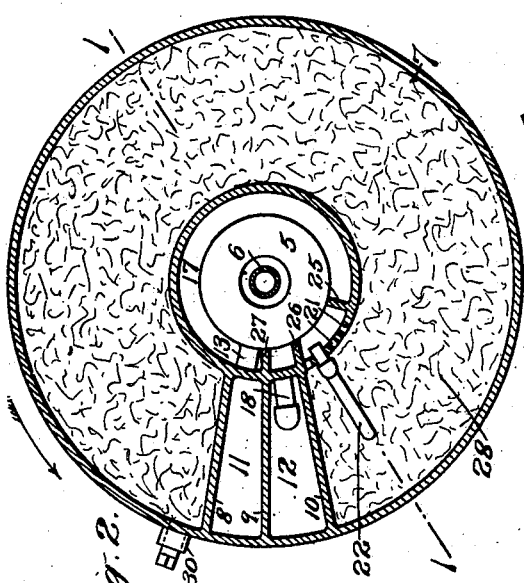
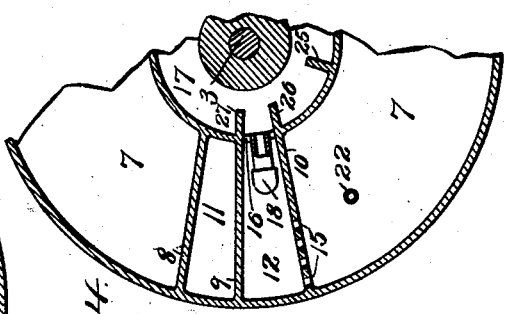
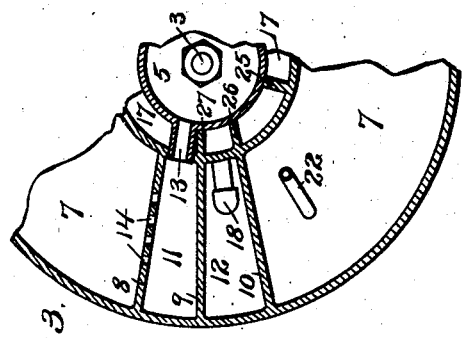
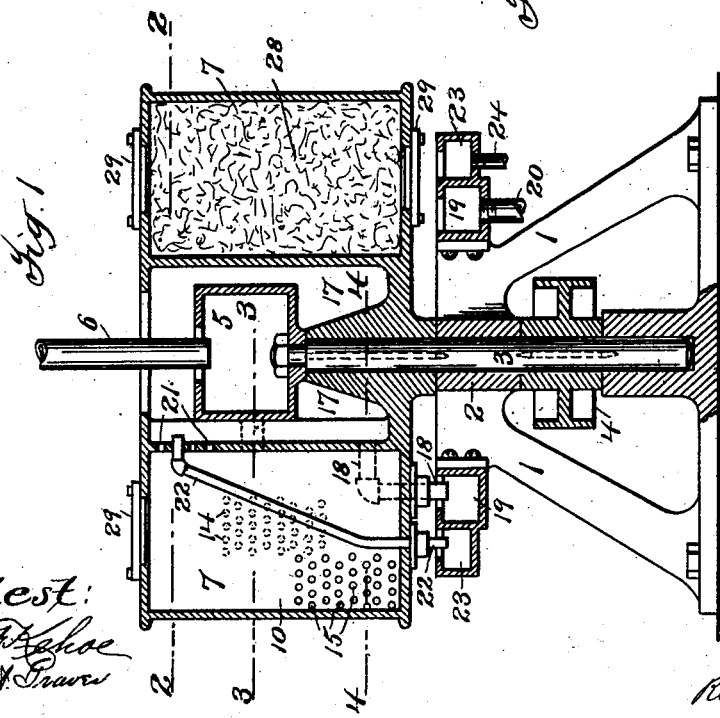
Inventor
Thomas Sault
By Philip Sawyer
Rice & Kennedy
Attys
Attest:
P. H. Kehoe
J. A. Traver No. 745,297. PATENTED NOV. 24, 1903.
T. SAULT.
APPARATUS FOR PURIFYING BOILER FEED WATER.
APPLICATION FILED FEB. 25, 1901.
NO MODEL. 3 SHEETS—SHEET 2.
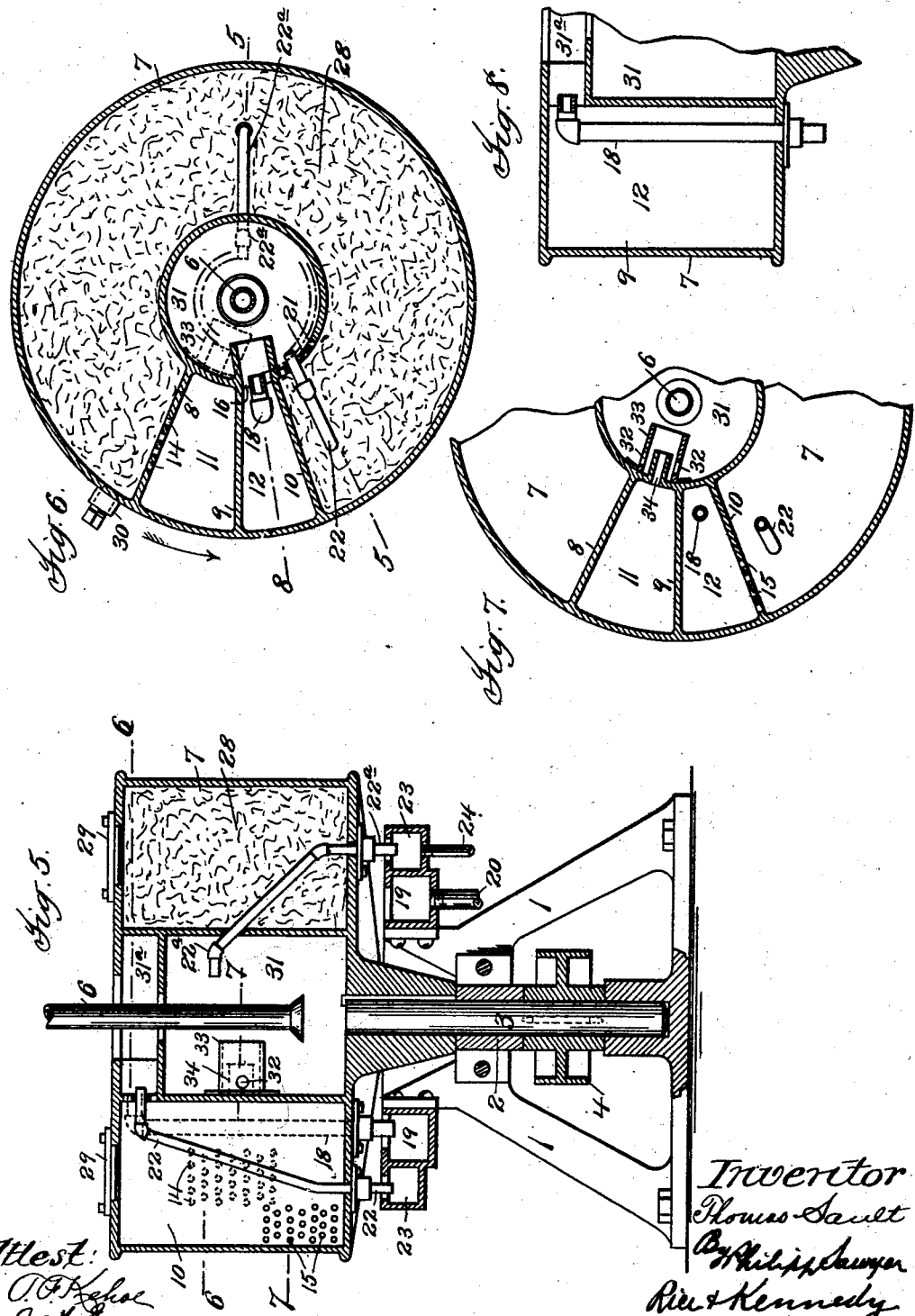

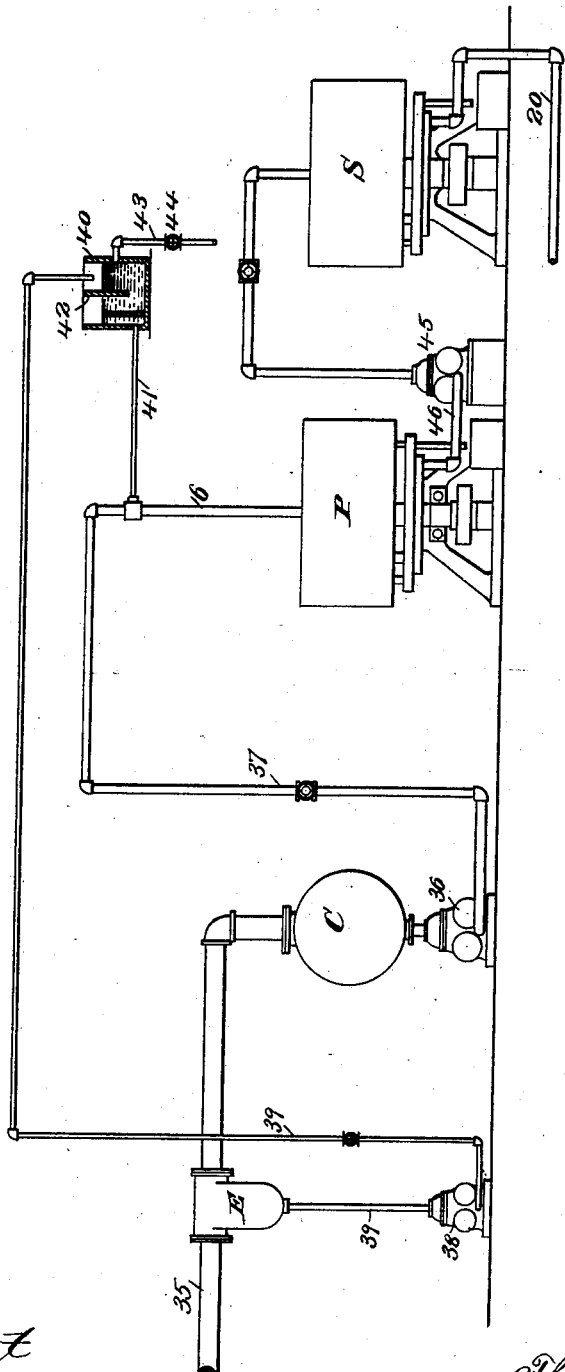

No. 745,297. Patented November 24, 1903.

UNITED STATES PATENT OFFICE.

THOMAS SAULT, OF NEW HAVEN, CONNECTICUT, ASSIGNOR TO LOUIS R. ALBERGER, OF NEW YORK, N. Y.

APPARATUS FOR PURIFYING BOILER FEED-WATER.

SPECIFICATION forming part of Letters Patent No. 745,297, dated November 24, 1903.

Application filed February 25, 1901. Serial No. 48,752. (No model.)

*To all whom it may concern:*

Be it known that I, THOMAS SAULT, a citizen of the United States, residing at New Haven, county of New Haven, and State of Connecticut, have invented certain new and useful Improvements in Apparatus for Purifying Boiler Feed-Water and other Liquids, fully described and represented in the following specification and the accompanying drawings, forming a part of the same.

This invention relates to apparatus for purifying boiler feed-water and other liquids by separating therefrom their suspended constituents, and particularly oil or fat, so as to render such liquids suitable for use.

The improvements of the present invention, though they may be used for the purification in this way of liquids generally, have been designed with especial reference to and will therefore and for convenience be described in detail in connection with the more difficult operation of purifying the water resulting from the condensation of exhaust-steam from engines or the like, so as to render it suitable for reuse in the boiler by separating therefrom the oil which the steam takes up in passing the steam-cylinders, valves, and other lubricated parts of the system. Part of this oil has heretofore been separated by the use of separators consisting of settling-tanks, in which the oily water is permitted to stand for a time, the difference in specific gravity between the two liquids being relied upon to cause the oil to rise to the surface of the water, from which it can then be skimmed or run off. A complete separation of the oil, however, cannot be effected by such settling-tanks, as they only separate part of the oil, or what may be termed the "coarser" or more readily separated oil, sufficient oil still remaining in the water to render it unsuitable for use, and this remaining oil being so thoroughly intermixed with the water, in an apparently emulsified condition, that it cannot be separated therefrom in this way even if the water containing it be permitted to stand for days or weeks, the particles of such oil being so minute and presenting such a great surface and adhering so tenaciously to the water as to resist the action of gravity which tends to separate the oil and water.

Many other different forms of apparatus have been suggested for effecting a separation of the oil from the water, but in none of them has a complete separation of oil been effected. They are, moreover, expensive, requiring constant care and attention to avoid faulty operation, and frequent stoppage of the operation being also necessary for cleansing the apparatus or cleansing and replenishing the materials employed, which rendered the separating processes carried out in them intermittent and consequently slow, as in the case of the settling-tanks.

It is the object of the present invention to provide apparatus for this purpose which will be continuous in its action and which will rapidly, economically, and completely separate the oil from the water.

To this end the invention as to its principal feature, generally stated, consists in a centrifugal separator, or what may be termed a "combined separator and purifier," because of its peculiar action, comprising a separator-chamber provided with a suitable inlet for the oily water and with suitable outlets for the purified water and the oil and containing a filling consisting of a mass of suitable material through which the water passes and the surfaces of which are of such a character as to attract and cause the deposition upon them of suspended particles of the oil and at the same time permit the movement through the mass of accumulations of such oil by pressure of the water under the action of centrifugal force. Part of the oil in such apparatus is separated from the water by centrifugal force and the remainder or finer oil separated by deposition upon such surfaces and discharged from the separator by the pressure of the water, which moves the accumulations of oil through the mass toward the point of discharge at the center of the separator.

When operating upon very oily water or water in large quantities, this apparatus may and preferably will have combined with it some form of preseparator—as, for example, a centrifugal separator—for the partial preseparation of oil, so as to relieve such separator and purifier of a portion of the work. Also when operating upon water of condensation a preseparator—as, for example, any suitable form of exhaust-separator—may and preferably will be employed for the partial separation of oil from the exhaust-steam, so as to further relieve the separator and purifier of work.

The invention embodies various other features, which will be hereinafter referred to, and particularly pointed out in the claims.

In the accompanying drawings, Figure 1 is a sectional elevation of the combined separator and purifier referred to for effecting the separation of the oil by centrifugal force and by causing the deposition of suspended particles of oil on the surfaces of said filling. Figs. 2, 3, and 4 are horizontal sections of the same, taken on the lines 2, 3, and 4, respectively, of Fig. 1. Fig. 5 is a sectional elevation illustrating a separator and purifier such as that illustrated in Fig. 1, having combined with it a preseparator for the partial preseparation of oil from the water before its delivery to said combined separator and purifier. Figs. 6 and 7 are sections taken on the lines 6 and 7, respectively, of Fig. 5. Fig. 8 is a section on the line 8 of Fig. 6; and Fig. 9 is a diagrammatic view illustrating part of a steam-power plant equipped with an exhaust-separator for partial separation of oil from the exhaust-steam, a preseparator for partial separation of oil from the water of condensation, and a combined separator and purifier for the complete separation of oil therefrom.

Referring to said drawings, the apparatus of Figs. 1 to 4, which embodies the principal feature of the invention, will first be described. This apparatus consists of a suitable base 1, provided with a bearing 2 for a shaft 3, to which is keyed a pulley 4, by which it is rotated, said shaft bearing at its upper end a centrifugal bucket rigidly secured to and rotating with it. This bucket is provided with an inner receiving-chamber 5, entered by a pipe 6, through which the oily water to be purified is supplied. It is also provided with an outer annular chamber 7, which may be termed the "separator" and "purifier" chamber and which is provided with vertical walls 8 9 10, forming an inlet-chamber 11 for the oil-laden water and an outlet-chamber 12 for the purified water. The receiving-chamber 5 communicates with the inlet-chamber 11 through a port or passage 13, and said inlet-chamber 11 in turn communicates with the body of the chamber 7 through openings or perforations 14 in the wall 8, as best illustrated in Figs. 1 and 3, so that as the oily water is introduced by the pipe 6 into the receiving-chamber 5 it will pass through the port or passage 13 into the chamber 11 and thence through the openings 14 into the body of the annular chamber 7. The outlet or discharge chamber 12 for the purified water communicates with the body of the annular chamber 7 through openings 15 in the wall 10, (see Figs. 1 and 4,) near the outer wall or periphery of the chamber 7, through which openings the purified water enters the chamber 12 from chamber 7. Said chamber 12 is also provided at or near its lower end with an opening 16, leading into a central chamber 17, inclosing the receiving-chamber 5, and in this opening is located one end of a discharge-pipe 18, leading into a water trough or receptacle 19, secured to the base 1 of the machine. By locating the discharge-outlet for the water in this position—that is, near the center of rotation of the bucket—the water as it is discharged offers but little resistance to the rotation of the bucket. As the purified water enters the chamber 12, therefore, from the annular separator-chamber 7 it passes through the opening 16 in the lower end of said chamber 12 into the chamber 17, and thence through the discharge-pipe 18 into the trough 19, which is provided with a pipe 20 for the delivery of the purified water to the boiler or other place of use. The inner wall of the annular chamber 7 is provided at or near its upper end and near the wall 10 with openings or oil-outlets 21, through which the annular chamber 7 communicates with the chamber 17. An oil-discharge pipe 22 is provided at the openings 21, with its upper end projecting into the chamber 17 and its lower end into an oil-trough 23 for carrying off the oil as it issues from the chamber 7 through the openings 21, the trough 23 being provided with a pipe 24, leading to a suitable oil-receptacle. Wings 25 26 27, extending from top to bottom of the chamber 17 alongside the water-outlet 16 and oil-outlets 21, form separate passage-ways for the discharged water and oil.

With an apparatus constructed as thus far described as the oil-laden water is delivered by the pipe 6 to the receiving-chamber 5 it passes through the port 13, chamber 11, and perforations 14 into the body of the annular separator-chamber 7, and the bucket being rotated in the direction of the arrow in Fig. 2 part of the oil carried by the water will be separated therefrom simply by the action of centrifugal force, the water moving outward and forcing the oil inward. The oil thus separated from the water will pass through the outlet-openings 21 into the chamber 17 and thence through the pipe 22 into the oil-trough 23, while the water will pass through the openings 15 into the discharge-chamber 12, and thence through the outlet 16 into the chamber 17 and through the discharge-pipe 18 into the water-trough 19. The water thus passing off from the chamber 7, however, would not be entirely purified or freed from oil if centrifugal force alone were depended upon for the separation of the oil from the water, as the more finely divided particles of the oil adhere so tenaciously to the water as to resist the tendency of centrifugal force and of gravity to separate them from the water. This complete separation of oil and water, however, can be effected by providing the separator-chamber with a filling 28, consisting of a mass of suitable material, which preferably entirely fills said chamber, and coating the surfaces of such material with oil, which, as the oily water passes through said filling, will attract those particles of oil which are not separated by centrifugal force and cause them to be deposited upon the surfaces of such filling material. The particles of oil so deposited on these surfaces as they accumulate become mobile and are continuously forced inward along these surfaces and through the mass by the pressure of the water within the chamber 7 under the action of centrifugal force and caused to pass off through the openings 21, with the oil separated from the water by centrifugal action. The adhesion between the oil and the surfaces of the filling material, however, is such as to prevent the entire removal of oil from the filling by centrifugal action or by the flow of water through the filling, so that there will always remain upon such surfaces sufficient of the oil for the attraction of the particles suspended in the water.

By the action of centrifugal force and the passage of the water through this oil-covered filling, therefore, the oil is completely separated from the water, which is thus purified and rendered suitable for use in boilers or for other purposes. The process, moreover, is continuous and rapid, the water being purified as rapidly as it is supplied to the separator and purifier, and the deposited oil, as before stated, carried off continuously as fast as it is deposited upon the oiled surfaces of the material constituting the filling, the entire surfaces of the material being thus kept constantly clear and in working condition. Again, even should globules of oil become disturbed and detached from such surfaces they will be of such size as to be readily separated by centrifugal action and forced from chamber 7. It will also be observed that the oily-water inlets 14 and purified-water outlets 15 and the filling are so located relatively to each other, the filling being located between them, that the water entering chamber 7 is compelled to pass through said filling before it reaches the outlets 15.

Preferably the surfaces of the material constituting the filling 28 are oiled before the operation of the combined separator and purifier is begun; but this is not essential, as such oiling may take place during its operation, the surfaces of the filling in such case being gradually coated by taking up oil from the water passing through it.

The filling may consist of a mass of any material presenting surfaces of a size and character capable of receiving and retaining a coating of oil or like substance having an affinity for and capable of attracting and causing the deposition upon them of particles of the substance to be separated and of permitting said deposited particles as they accumulate to be moved along them and through the mass by the pressure of the liquid under the action of centrifugal force to the discharge-point—such, for example, as pieces or sheets of metal, coke, wood, gravel, charcoal, iron or brass turnings, or wire-gauze—and such materials may be of regular or irregular form and laid upon or in close proximity to each other in regular or irregular order. Where irregular pieces of material are employed, as shown, it will be understood that irregular passages will be formed for the passage of the water and oil and that the oil in passing over the oiled surfaces will jump from one piece of material to the next, and so on until it escapes from the vessel.

The separator-chamber 7 is of course closed during the separating and purifying operation and is provided with hand-holes closed by suitable covers 29, so that access may readily be had to the interior of said chamber for the purpose of inspecting or renewing and replenishing or oiling the filling material or for other purposes. The chamber 7 will also preferably be provided with an opening or pipe 30 for the introduction of steam or wash-water for cleansing said chamber and its filling 28, this pipe being of course closed during the operation of the apparatus.

As hereinbefore stated, the centrifugal separator and purifier of Figs. 1 to 4 may and preferably will have combined with it suitable preseparating means for partially separating the oil from the water, so as to relieve the separator and purifier of a portion of the work. I prefer a centrifugal separator for this purpose and to locate such centrifugal separator in the same bucket with the combined separator and purifier, the preseparator in such case serving also the functions of the receiving-chamber 5 of Figs. 1 to 4.

In Figs. 5 to 8 I have shown such an arrangement, the preseparator shown being formed in the same bucket with the combined separator and purifier and consisting of a central chamber 31, into which the delivery-pipe 6 enters, the chamber 5 of Figs. 1 to 4 being omitted. In this chamber 31 as the bucket is rotated part of the oil is separated from the water by the action of centrifugal force, the water moving outward and forcing the oil inward, as before described in connection with the annular chamber 7 of Figs. 1 to 4. Part of the oil thus separated from the water in this preseparator-chamber 31 passes through a discharge-pipe $22^a$ into the oil-trough 23, and the remainder passes upwardly through an opening in the top wall of the chamber 31 around the pipe 6 into an oil-chamber $31^a$ and thence downwardly through the discharge-pipe 22 into the oil-trough 23, while the water from which the oil is thus separated and which still carries oil enters the annular separator-chamber 7 through radial or side openings 32 in an open-ended casing or sleeve 33, projecting into the chamber 31, and thence through a short pipe 34, inclosed by the sleeve 33, into the inlet-chamber 11, whence it passes into the body of the chamber 7 to be further purified in the manner described in connection with Figs. 1 to 4. The inlet ends of oil-pipe $22^a$ and water-pipe 34 extend inwardly different distances, as will be observed, the former extending inwardly farther than the latter, the purpose of this arrangement being to locate these two pipes approximately in the field or space, as indicated by dotted lines, Fig. 6, occupied by the separated oil and oily water, and thus avoid the liability of the latter escaping by the oil-pipe, and vice versa. Escape of separated oil by the water-pipe 34 is further guarded against by the provision of the sleeve 33 projecting beyond the end of said pipe and the location of the inlet-openings 32 therein in close proximity to the wall or periphery of the chamber 31. By this preliminary treatment of the water and the partial separation therefrom of oil the work to be done by the combined separator and purifier is very much reduced and the capacity of the combined separator and purifier and its speed of operation therefore very materially increased. Another advantage resulting from the employment of such preseparator is that any particles of metal from wear of the engines or rust, dust, pieces of packing, carbonized oil or fat, &c., carried by the water of condensation are caught and thrown outwardly in the preseparator-case and not permitted to enter the combined separator and purifier, where they might injure the filling material or otherwise interfere with the operation of the separator and purifier, these impurities being afterward removed by hand when the machine has been stopped.

Instead of using a preseparator in the same bucket with the combined separator and purifier, as in Figs. 5 to 8, a preseparator may be employed which is in a separate bucket, as will be explained in describing Fig. 9.

When operating upon water of condensation also, a preseparator may be added to the apparatus, as before stated—namely, for the treatment of the exhaust-steam before condensation for the separation and removal of part of the oil therefrom—and apparatus suitable for this purpose is shown in Fig. 9, which will now be described. In this figure of the drawings I have illustrated in diagram part of a steam-power plant equipped with apparatus for the partial separation of oil from the exhaust-steam, partial separation of oil from the water of condensation, and final complete separation and purification of the water of condensation, rendering it suitable for reuse in the boiler. In this view, 35 indicates a steam-exhaust pipe, and C a condenser to which the steam is delivered thereby, while 36 37 indicate a pump and piping for delivering the water of condensation from the condenser C to the delivery-pipe 6, leading to a preseparator P, whence the water, partially freed from oil, is delivered to a separator and purifier S, where it is finally freed from oil and returned to the boiler by pipe 20. The separator and purifier S of this figure is the same in construction and operation as that illustrated in Figs. 1 to 4, while the preseparator P instead of being in the same bucket with the separator and purifier, as in Figs. 5 to 8, is in a separate bucket and is the same in construction as the separator and purifier of Figs. 1 to 4 except that it is unprovided with the filling 28 of that figure, though such filling may be employed, if desired.

The steam-exhaust pipe 35 of Fig. 9 connects with an exhaust-separator E, which may be of any approved form and which as the steam passes through it on its way to the condenser C separates therefrom part of the more-readily-separated oil which it carries, the oil so separated being trapped in the lower end of the separator. The steam after passing the exhaust-separator E enters the condenser C, where it is condensed, the water of condensation being thence delivered by the pump and piping 36 37 to the delivery-pipe 6, as just described.

The oil separated from the steam by the exhaust-separator E and trapped in the lower end thereof may be run off into a suitable oil-receptacle, if desired; but as such exhaust-steam will carry with it considerable water of condensation which will be trapped with the separated oil in the exhaust-separator I treat the contents of the exhaust-separator for the separation of the oil and water. To the lower end of the exhaust-separator I connect a pump and piping 38 39, which deliver the mixed oil and water therefrom into a settling-tank 40, which is provided with an outlet-pipe 41, connected with the delivery-pipe 6, leading to the preseparator P. The tank 40 is provided with a transverse partition 42 between the inlet and outlet pipes 39 41 and extending downwardly to within a short distance of the bottom of the tank, the function of this partition being to interrupt the flow of the mixed oil and water through the tank, and thus cause the readily-separated portion of the oil to rise to the surface of the water on the inlet side of the partition 42, from which it is run off through a discharge-pipe 43, which may be provided with a cock 44, while the water which still contains oil passes under the partition 42 and through the pipe 41 into the pipe 6 and may pass thence, if it be desired to save it for reuse in the boiler, into the preseparator P with the water of condensation from the condenser C, whence the water, partially purified, is pumped into pipe 6, leading into the separator and purifier S by pump and piping 45 46. To further provide against the escape of oil from the tank 40, it is provided with a second partition $42^a$, rising from the bottom of the tank between the partition 42 and outlet-pipe 41.

It is to be understood that changes and modifications may be made in the construction and arrangement of the apparatus shown and described without departing from the invention broadly considered.

What I claim is—

1. A centrifugal separator comprising a chamber containing a filling consisting of a mass of suitable material through which a liquid may be passed and whose surfaces are adapted for the deposition upon them of particles of the suspended constituents of the liquid and for the movement along them and through the mass of accumulations thereof by the action of centrifugal force upon the liquid, substantially as described.

2. A centrifugal separator comprising a chamber containing a filling consisting of a mass of suitable material through which a liquid may be passed and whose surfaces are adapted for the deposition upon them of particles of the suspended constituents of the liquid and for the movement along them and through the mass of accumulations thereof by the action of centrifugal force upon the liquid, in combination with means communicating with said chamber for effecting a partial separation of said constituents before delivery of the liquid to said separator, substantially as described.

3. A centrifugal separator comprising a chamber containing a filling consisting of a mass of suitable material through which a liquid may be passed and whose surfaces are adapted for the deposition upon them of particles of the suspended constituents of the liquid and for the movement along them and through the mass of accumulations thereof by the action of centrifugal force upon the liquid, in combination with a second centrifugal separator communicating with said chamber for effecting a partial separation of said constituents before delivery of the liquid to said chamber, substantially as described.

4. A centrifugal separator comprising an inner preseparator-chamber and an outer separator-chamber into which it delivers its contents, containing a filling consisting of a mass of suitable material through which a liquid may be passed and whose surfaces are adapted for the deposition upon them of particles of the suspended constituents of the liquid and for the movement along them and through the mass of accumulations thereof by the action of centrifugal force upon the liquid, substantially as described.

5. A centrifugal separator for oily water, comprising a chamber containing a filling consisting of a mass of suitable material through which the oily water may be passed and whose surfaces are adapted for the deposition upon them of suspended particles of oil and for the movement along them and through the mass of accumulations thereof by the action of centrifugal force upon the water, substantially as described.

6. A centrifugal separator for oily water, comprising a chamber containing a filling consisting of a mass of suitable material through which the oily water may be passed and whose surfaces are adapted for the deposition upon them of suspended particles of oil and for the movement along them and through the mass of accumulations thereof by the action of centrifugal force upon the water, in combination with means communicating with said chamber for effecting a partial separation of oil before delivery of the water to said separator, substantially as described.

7. A centrifugal separator for oily water, comprising a chamber containing a filling consisting of a mass of suitable material through which the oily water may be passed and whose surfaces are adapted for the deposition upon them of suspended particles of oil and for the movement along them and through the mass of accumulations thereof by the action of centrifugal force upon the water, in combination with a centrifugal separator communicating with said chamber for effecting a partial separation of oil before delivery of the water to the said chamber, substantially as described.

8. A centrifugal separator for oily water comprising an inner preseparator-chamber and an outer separator-chamber into which it delivers its contents, containing a filling consisting of a mass of suitable material through which the oily water may be passed and whose surfaces are adapted for the deposition upon them of suspended particles of oil and for the movement along them and through the mass of accumulations thereof by the action of centrifugal force upon the water, substantially as described.

9. A centrifugal separator for oily water comprising an inner receiving-chamber and an outer separator-chamber with which it communicates, containing a filling consisting of a mass of suitable material through which the oily water may be passed and whose surfaces are adapted for the deposition upon them of suspended particles of oil and for the movement along them and through the mass of accumulations thereof by the action of centrifugal force upon the water, substantially as described.

10. A centrifugal separator for oily water comprising an inner preseparator-chamber and an outer separator-chamber into which it delivers its contents, containing a filling consisting of a mass of suitable material through which the oily water may be passed and whose surfaces are adapted for the deposition upon them of suspended particles of oil and for the movement along them and through the mass of accumulations thereof by the action of centrifugal force upon the water, and an oil-discharge pipe leading from said preseparator-chamber, substantially as described.

11. A centrifugal separator for oily water comprising an inner preseparator-chamber, an outer separator-chamber into which said preseparator-chamber delivers its contents, containing a filling consisting of a mass of suitable material through which the oily water may be passed and whose surfaces are adapted for the deposition upon them of suspended particles of oil and for the movement along them and through the mass of accumulations thereof by the action of centrifugal force upon the water, an oil-discharge pipe leading from said preseparator-chamber, and an oily-water pipe leading from said preseparator-chamber to the outer chamber, substantially as described.

12. A centrifugal separator comprising a chamber provided with an oily-water inlet and a water-outlet and containing a filling consisting of a mass of suitable material located between said inlet and outlet, and whose surfaces are adapted for the deposition upon them of suspended particles of oil and for the movement along them and through the mass of accumulations thereof by the action of centrifugal force upon the water, substantially as described.

13. A centrifugal separator comprising a chamber provided with an oily-water inlet and a water-outlet and containing a filling consisting of a mass of suitable material located between said inlet and outlet, and whose surfaces are adapted for the deposition upon them of suspended particles of oil and for the movement along them and through the mass of accumulations thereof by the action of centrifugal force upon the water, said outlet discharging in proximity to the side thereof next the center of rotation of the separator, substantially as described.

14. A centrifugal separator for oily water comprising a chamber provided with an oily-water-inlet chamber and a water-outlet chamber into which said inlet-chamber delivers its contents and containing a filling consisting of a mass of suitable material located between said chambers, and whose surfaces are adapted for the deposition upon them of suspended particles of oil and for the movement along them and through the mass of accumulations thereof by the action of centrifugal force upon the water, substantially as described.

15. A centrifugal separator for oily water comprising a chamber provided with an oily-water-inlet chamber and a water-outlet chamber into which said inlet-chamber delivers its contents and containing a filling consisting of a mass of suitable material located between said chambers, and whose surfaces are adapted for the deposition upon them of suspended particles of oil and for the movement along them and through the mass of accumulations thereof by the action of centrifugal force upon the water, the discharge-outlet of said outlet-chamber being located in proximity to the side thereof next the center of rotation of the separator, substantially as described.

16. A centrifugal separator for oily water comprising a chamber provided with an oily-water-inlet chamber, a water-outlet chamber and an oil-outlet, and containing a filling consisting of a mass of suitable material located between said inlet-chamber and said outlet-chamber and outlet and whose surfaces are adapted for the deposition upon them of suspended particles of oil and for the movement along them and through the mass of accumulations thereof by the action of centrifugal force upon the water, substantially as described.

17. The combination with a suitable condensing means for exhaust-steam, of a centrifugal separator to which the water of condensation is delivered, comprising a chamber containing a filling consisting of a mass of suitable material through which the oily water may be passed and whose surfaces are adapted for the deposition upon them of suspended particles of oil and for the movement along them and through the mass of accumulations thereof by the action of centrifugal force upon the water, substantially as described.

18. The combination with a suitable condensing means for exhaust-steam, of a separator to which the water of condensation is delivered for the partial separation of oil, and a centrifugal separator to which the water is then delivered, comprising a chamber containing a filling consisting of a mass of suitable material through which the oily water may be passed and whose surfaces are adapted for the deposition upon them of suspended particles of oil and for the movement along them and through the mass of accumulations thereof by the action of centrifugal force upon the water, substantially as described.

19. The combination with a suitable condensing means for exhaust-steam, of a centrifugal separator to which the water of condensation is delivered for the partial separation of oil, and a centrifugal separator to which the water is then delivered, comprising a chamber containing a filling consisting of a mass of suitable material through which the oily water may be passed and whose surfaces are adapted for the deposition upon them of suspended particles of oil and for the movement along them and through the mass of accumulations thereof by the action of centrifugal force upon the water, substantially as described.

20. In an oil-separating system for exhaust-steam and its water of condensation, the combination of a separator for effecting a partial separation of oil from the steam, suitable condensing means for the partially-purified steam, and a centrifugal separator to which the water of condensation is delivered from said condensing means, comprising a chamber containing a filling consisting of a mass of suitable material through which the water is passed and whose surfaces are adapted for the deposition upon them of suspended particles of oil and for the movement along them and through the mass of accumulations thereof by the action of centrifugal force upon the water, substantially as described.

21. In an oil-separating system for exhaust-steam and its water of condensation, the combination of a separator for effecting a partial separation of oil from the steam, suitable condensing means for the partially-purified steam, a separator to which the water of condensation is delivered from said condensing means for effecting a partial separation of oil from said water, and a centrifugal separator to which the water is delivered therefrom, comprising a chamber containing a filling consisting of a mass of suitable material through which the water is passed and whose surfaces are adapted for the deposition upon them of suspended particles of oil and for the movement along them and through the mass of accumulations thereof by the action of centrifugal force upon the water, substantially as described.

22. In an oil-separating system for exhaust-steam and its water of condensation, the combination of a separator for effecting a partial separation of oil from the steam, suitable condensing means for the partially-purified steam, a centrifugal separator to which the water of condensation is delivered from said condensing means for effecting a partial separation of oil from said water, and a second centrifugal separator to which the water is delivered therefrom, comprising a chamber containing a filling consisting of a mass of suitable material through which the oily water may be passed and whose surfaces are adapted for the deposition upon them of suspended particles of oil and for the movement along them and through the mass of accumulations thereof by the action of centrifugal force upon the water, substantially as described.

23. In an oil-separating system for exhaust-steam and its water of condensation, the combination of a separator for separating oil from the steam, a second separator for effecting a partial separation of this oil from the water of condensation which passes off with it from the steam, and a centrifugal separator to which the water thus separated is delivered from said second separator, comprising a chamber containing a filling consisting of a mass of suitable material through which the water is passed and whose surfaces are adapted for the deposition upon them of suspended particles of oil and for the movement along them and through the mass of accumulations thereof by the action of centrifugal force upon the water, substantially as described.

24. In an oil-separating system for exhaust-steam and its water of condensation, the combination of a separator for separating oil from the steam, a second separator for effecting a partial separation of this oil from the water of condensation which passes off with it from the steam, a centrifugal separator to which the water thus separated is delivered from said second separator, and a second centrifugal separator to which the water is delivered from the latter, comprising a chamber containing a filling consisting of a mass of suitable material through which the water passes and whose surfaces are adapted for the deposition upon them of suspended particles of oil and for the movement along them and through the mass of accumulations thereof by the action of centrifugal force upon the water, substantially as described.

25. In an oil-separating system for exhaust-steam and its water of condensation, the combination of a separator for effecting a partial separation of oil from the steam, a second separator for effecting a partial separation of this oil from the water of condensation which passes off with it from the steam, suitable condensing means for the partially-purified steam, and a centrifugal separator to which the water is delivered from said second separator and said condensing means, comprising a chamber containing a filling consisting of a mass of suitable material through which the water is passed and whose surfaces are adapted for the deposition upon them of suspended particles of oil and for the movement along them and through the mass of accumulations thereof by the action of centrifugal force upon the water, substantially as described.

26. In an oil-separating system for exhaust-steam and its water of condensation, the combination of a separator for effecting a partial separation of oil from the steam, a second separator for effecting a partial separation of this oil from the water of condensation which passes off with it from the steam, suitable condensing means for the partially-purified steam, a centrifugal separator to which the water is delivered from said second separator and said condensing means, and a second centrifugal separator to which the water is delivered from said centrifugal separator, comprising a chamber containing a filling consisting of a mass of suitable material through which the water is passed and whose surfaces are adapted for the deposition upon them of suspended particles of oil and for the movement along them and through the mass of accumulations thereof by the action of centrifugal force upon the water, substantially as described.

27. In an oil-separating system for exhaust-steam and its water of condensation, the combination of a separator for effecting a partial separation of oil from the steam, a settling-tank for effecting a partial separation of this oil from the water of condensation which passes off with it from the steam, condensing means for the partially-purified exhaust-steam, and a centrifugal separator to which the water is delivered from said settling-tank and said condensing means, comprising a chamber containing a filling consisting of a mass of suitable material through which the water is passed and whose surfaces are adapted for the deposition upon them of suspended particles of oil and for the movement along them and through the mass of accumulations thereof by the action of centrifugal force upon the water, substantially as described.

28. In an oil-separating system for exaust-steam and its water of condensation, the combination of a separator for effecting a partial separation of oil from the steam, a settling-tank for effecting a partial separation of this oil from the water of condensation which passes off with it from the steam, condensing means for the partially-purified exhaust-steam, a centrifugal separator to which the water is delivered from said settling-tank and said condensing means, and a second centrifugal separator to which the water is delivered from said centrifugal separator, comprising a chamber containing a filling consisting of a mass of suitable material through which the water is passed and whose surfaces are adapted for the deposition upon them of suspended particles of oil and for the movement along them and through the mass of accumulations thereof by the action of centrifugal force upon the water, substantially as described.

29. A centrifugal separator comprising a preseparator-chamber and a separator-chamber rotating upon the same axis and into which said preseparator-chamber delivers its contents, the latter chamber containing a filling of suitable material, substantially as described.

30. A centrifugal separator comprising an inner preseparator-chamber and an outer separator-chamber into which said preseparator-chamber delivers its contents, said chambers rotating upon the same axis and said outer chamber being provided with a filling of suitable material, substantially as described.

31. A centrifugal separator comprising an inner preseparator-chamber, an outer separator-chamber into which said preseparator-chamber delivers its contents, said chambers rotating upon the same axis and said outer chamber being provided with a filling of suitable material, an oil-chamber with which said preseparator-chamber communicates, provided with a suitable oil-discharge, and an oil-discharge pipe projecting into the preseparator-chamber, substantially as described.

32. A centrifugal separator comprising an inner preseparator-chamber, an outer separator-chamber into which said preseparator-chamber delivers its contents, said chambers rotating upon the same axis and said outer chamber being provided with a filling of suitable material, an oil-chamber common to said two chambers and provided with a suitable oil-discharge, and an oil-discharge pipe leading from the preseparator-chamber, substantially as described.

33. A centrifugal separator comprising an inner preseparator-chamber, an outer separator-chamber to which it delivers its contents, a water-pipe leading from the former to the latter and an oil-pipe leading from the preseparator-chamber with its inlet end in closer proximity than the inlet end of said water-pipe to the center of rotation of the separator, said two chambers rotating on the same axis and the outer chamber being provided with a filling of suitable material, substantially as described.

34. A centrifugal separator comprising a separator-chamber 7 containing a filling of suitable material and provided with water inlet and outlet chambers 11, 12 communicating with the body of said separator-chamber, substantially as described.

35. A centrifugal separator comprising a separator-chamber 7 containing a filling of suitable material and provided with water-inlet and water-outlet chambers 11, 12 communicating with the body of said separator-chamber, the outlet-chamber being provided with a discharge-opening in proximity to the side of the separator-chamber next the center of rotation of the separator, substantially as described.

36. The combination of a preseparator-chamber 31, separator-chamber 7, pipe 34 connecting said chambers and casing 33 inclosing said pipe and provided with side openings, said chamber 7 being provided with a filling of suitable material, substantially as described.

37. The combination of a preseparator-chamber 31, separator-chamber 7, pipe 34 connecting said chambers, casing 33 inclosing said pipe and provided with side openings, and oil-discharge pipe 22$^a$ leading from the preseparator-chamber, said separator-chamber 7 being provided with a filling of suitable material, substantially as described.

38. The combination of a preseparator-chamber 31, separator-chamber 7 with which it communicates, oil-chamber 31$^a$ and oil-pipes 22$^a$, 22 leading from said preseparator and oil chambers respectively, said separator-chamber 7 being provided with a filling of suitable material, substantially as described.

In testimony whereof I have hereunto set my hand in the presence of two subscribing witnesses.

THOMAS SAULT.

Witnesses:
J. C. CABLE,
H. D. THOMPSON.